(12) United States Patent
Gianoglio et al.

(10) Patent No.: US 7,373,233 B2
(45) Date of Patent: May 13, 2008

(54) SYSTEM AND METHOD FOR CONTROLLING THE COUPLING BETWEEN THE DRIVESHAFT AND THE PRIMARY GEAR SHAFT IN A MOTOR VEHICLE WITH A SERVO-CONTROLLED GEARBOX

(75) Inventors: Renato Gianoglio, deceased, late of Orbassano (IT); Claudia Supparo, legal representative, Turin (IT); Dario Del Pin, Orbassano (IT); Giovanni Ellena, Orbassano (IT); Massimo Fossanetti, Orbassano (IT); Massimo Lupo, Orbassano (IT); Attilio Porta, Orbassano (IT); Pandeli Borodani, Orbassano (IT)

(73) Assignee: C.R.F. Società Consortile per Azioni (IT)

(*) Notice: Subject to any disclaimer, the term of this patent is extended or adjusted under 35 U.S.C. 154(b) by 0 days.

(21) Appl. No.: 11/449,310

(22) Filed: Jun. 8, 2006

(65) Prior Publication Data

US 2006/0287793 A1 Dec. 21, 2006

(30) Foreign Application Priority Data

Jun. 17, 2005 (EP) .................................. 05425432

(51) Int. Cl.
*G06F 7/00* (2006.01)
*B60W 10/00* (2006.01)

(52) U.S. Cl. ............................ 701/51; 701/55; 701/56; 477/78

(58) Field of Classification Search .................. 701/51, 701/55, 56; 477/78
See application file for complete search history.

(56) References Cited

U.S. PATENT DOCUMENTS

| 5,609,545 A | * | 3/1997 | Sola et al. ..................... 477/78 |
| 6,023,647 A | * | 2/2000 | Saito et al. .................... 701/57 |
| 6,364,811 B1 | | 4/2002 | Hubbard et al. ............ 477/143 |
| 6,389,346 B1 | * | 5/2002 | Gianoglio et al. ............ 701/51 |
| 6,524,223 B2 | * | 2/2003 | Graf et al. ................... 477/109 |

FOREIGN PATENT DOCUMENTS

DE 100 45 892 A1 3/2003

OTHER PUBLICATIONS

European Search Report re application No. EP 05425431.1, dated Nov. 3, 2005.

* cited by examiner

*Primary Examiner*—Mark Hellner
(74) *Attorney, Agent, or Firm*—Cook, Alex, McFarron, Manzo, Cummings & Mehler, Ltd.

(57) ABSTRACT

What is described is a control system for controlling the coupling between a driveshaft of a motor vehicle propulsion system and a primary input shaft of a gearbox by means of a servo-assisted friction clutch.

A control unit receives at its input signals indicating a command imparted by the driver of the motor vehicle by operating the accelerator pedal in a driving-away or gear-changing manoeuvre, and generates—on the basis of a mathematical reference model—reference torque request signals indicating the reference torques requested from the driveshaft and from the friction clutch, the said request signals or data varying in time in such a way as to cause synchronization between the angular velocities of the driveshaft and of the primary gear shaft to be reached at the same moment as the difference between the angular accelerations of the said shafts becomes zero.

16 Claims, 5 Drawing Sheets

SYSTEM AND METHOD FOR CONTROLLING THE COUPLING BETWEEN THE DRIVESHAFT AND THE PRIMARY GEAR SHAFT IN A MOTOR VEHICLE WITH A SERVO-CONTROLLED GEARBOX

FIELD OF THE INVENTION

The present invention relates in a general way to the control of the propulsion of a motor vehicle, and more specifically to a system and method for controlling the coupling between the driveshaft and the primary gear shaft in a motor vehicle provided with a servo-controlled gearbox.

BACKGROUND OF THE INVENTION

In practice, a servo-controlled gearbox is a conventional mechanical gearbox operated by means of servo-controllers, comprising an actuator for disengaging and engaging the friction clutch between the driveshaft and the primary input shaft of the gearbox, an actuator for selecting the transmission ratios and an actuator for engaging the selected transmission ratio.

Servo-controlled gearboxes are well known in the prior art and are used to reproduce and optimize the driver's gear change commands.

The control strategies of a control system for a servo-controlled gearbox must adapt themselves to the operating conditions of the vehicle and must maintain the driving sensation requested by the driver by means of the commands imparted to the accelerator pedal.

A control system for a servo-controlled gearbox is known from U.S. Pat. No. 6,389,346 held by the present applicant. The system comprises an electronic control unit connected to a plurality of sensors for detecting the operating conditions of the vehicle, including a potentiometric sensor for detecting the position of the accelerator pedal, to the actuators of the gearbox, and to the actuators controlling the power delivered by the vehicle's propulsion system, in order to permit the integrated control of the propulsion system and the gearbox during a gear change operation.

The detection of the position of the accelerator pedal enables the driver's intentions to be correctly recognized.

The operation of the control unit is based on a reference model in which the actuator command signals are determined by means of a mathematical model of the driving behaviour, which is designed to adapt the behaviour of the vehicle in terms of comfort and performance, in the various stages of the gear change, according to the commands imparted by the driver by means of the accelerator pedal and a command lever or push button for selecting the transmission ratio, in other words for requesting a change to a higher or lower ratio.

In both a gear-change operation and a driving-away manoeuvre, the vehicle's propulsion system changes its mode of operation from clutch partially disengaged to clutch engaged. At the instant the clutch bites, the inertia applied to the engine changes virtually instantaneously, causing discontinuities in the vehicle's acceleration, specifically a negative change of acceleration which may be perceived by the driver and reduces the performance of the system.

SUMMARY OF THE INVENTION

The object of the present invention is to provide a control procedure for a servo-controlled gearbox, making it possible to control the coupling between the driveshaft and the primary shaft of the gearbox by compensating for the change of inertia applied to the engine in any manoeuvre involving engaging the clutch, in such a way as to obtain the functions and performance expected by the driver in accordance with the command imparted by means of the accelerator pedal.

The definition of a servo-controlled gearbox used in the remainder of the present description refers both to a gearbox of the type defined initially and to a configuration which does not provide for the servo-assisted actuation of the selection of the transmission ratios and of the engagement of the selected ratio, which can instead be controlled manually by the driver, but only for the servo-assisted actuation of the clutch control by means of electrical or electro-hydraulic actuators.

According to the present invention, this object is achieved by means of a control system and method having the characteristics claimed in Claims 1 and 10, respectively.

BRIEF DESCRIPTION OF THE DRAWINGS

Further advantages and characteristics of the invention will be made clear by the following detailed description, which refers to the attached drawings provided purely by way of example and without restrictive intent, in which.

DETAILED DESCRIPTION OF A PREFERRED EMBODIMENT

Figure 1:
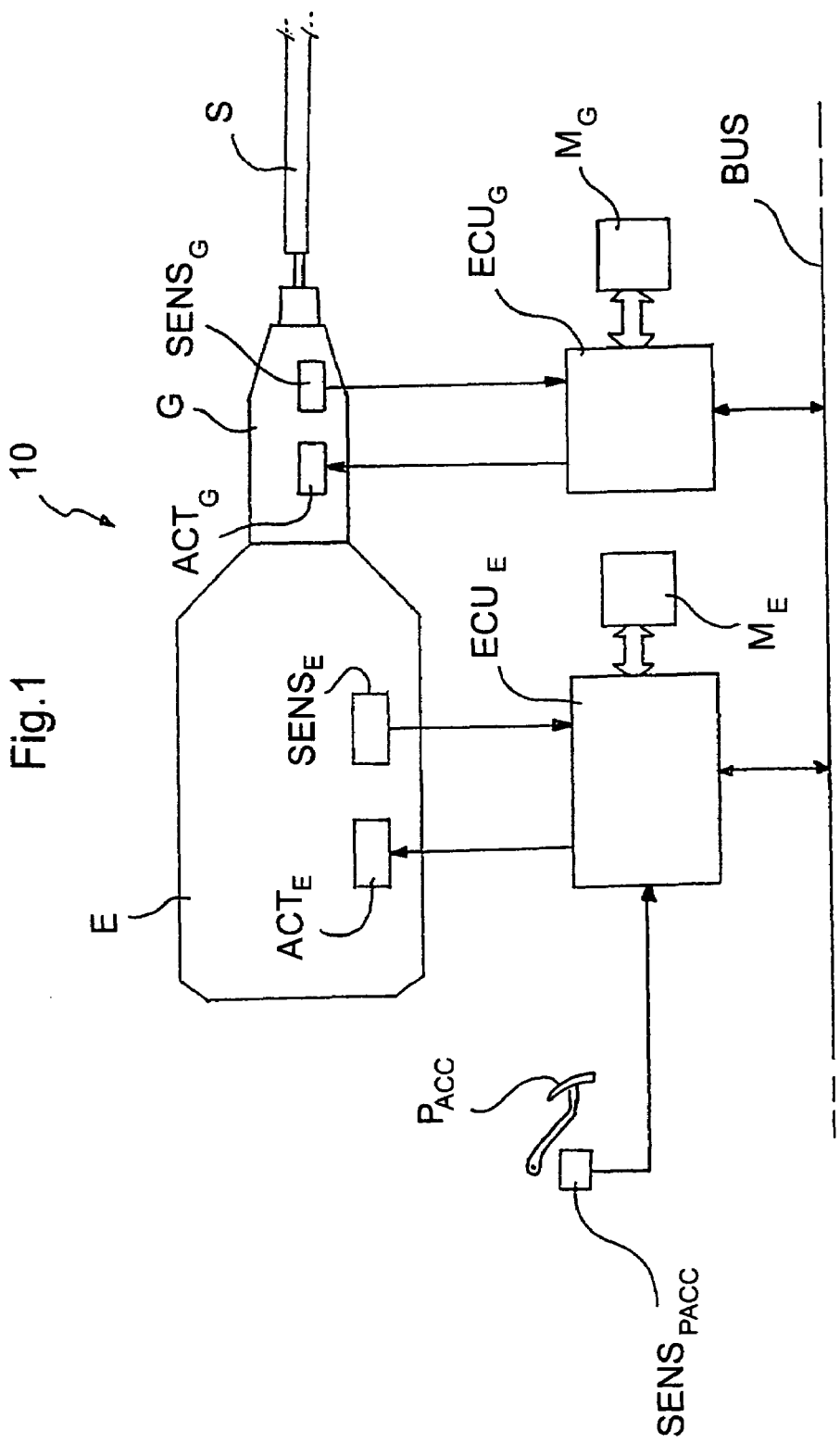
FIG. 1 is a schematic representation of an engine and transmission assembly of a vehicle; including a servo-controlled gearbox associated with a propulsion system.

To make matters clearer, FIG. 1 shows an engine and transmission assembly 10 of a motor vehicle, comprising a propulsion system such as an internal combustion thermal engine E which can transmit the mechanical energy developed to the driving wheels of the vehicle through a gearbox G, a transmission shaft S (partially illustrated in the figure) and a differential (not shown).

The thermal engine is associated with a first electronic processing and control unit $ECU_E$ which can be interfaced with sensor devices associated with the engine and engine actuator devices, indicated in their entirety by $SENS_E$ and $ACT_E$ respectively.

The gearbox G is associated with a second electronic processing and control unit $ECU_G$, which can be interfaced with sensor devices associated with the gearbox and actuator devices for the gearbox, indicated in their entirety by $SENS_G$ and $ACT_G$ respectively.

The two control units $ECU_E$ and $ECU_G$ are coupled to corresponding memory devices $M_E$ and $M_G$, and are connected to a common transmission line BUS, for example a line of a communication network according to the CAN protocol.

In an alternative embodiment, the units $ECU_E$ and $ECU_G$ can be integrated into a single processing unit in order to improve the overall performance of the system.

FIG. 1 also shows the connection of a sensor $SENS_{PACC}$ for detecting the position of the accelerator pedal $P_{ACC}$ at the input to the engine control unit $ECU_E$.

Figure 2:
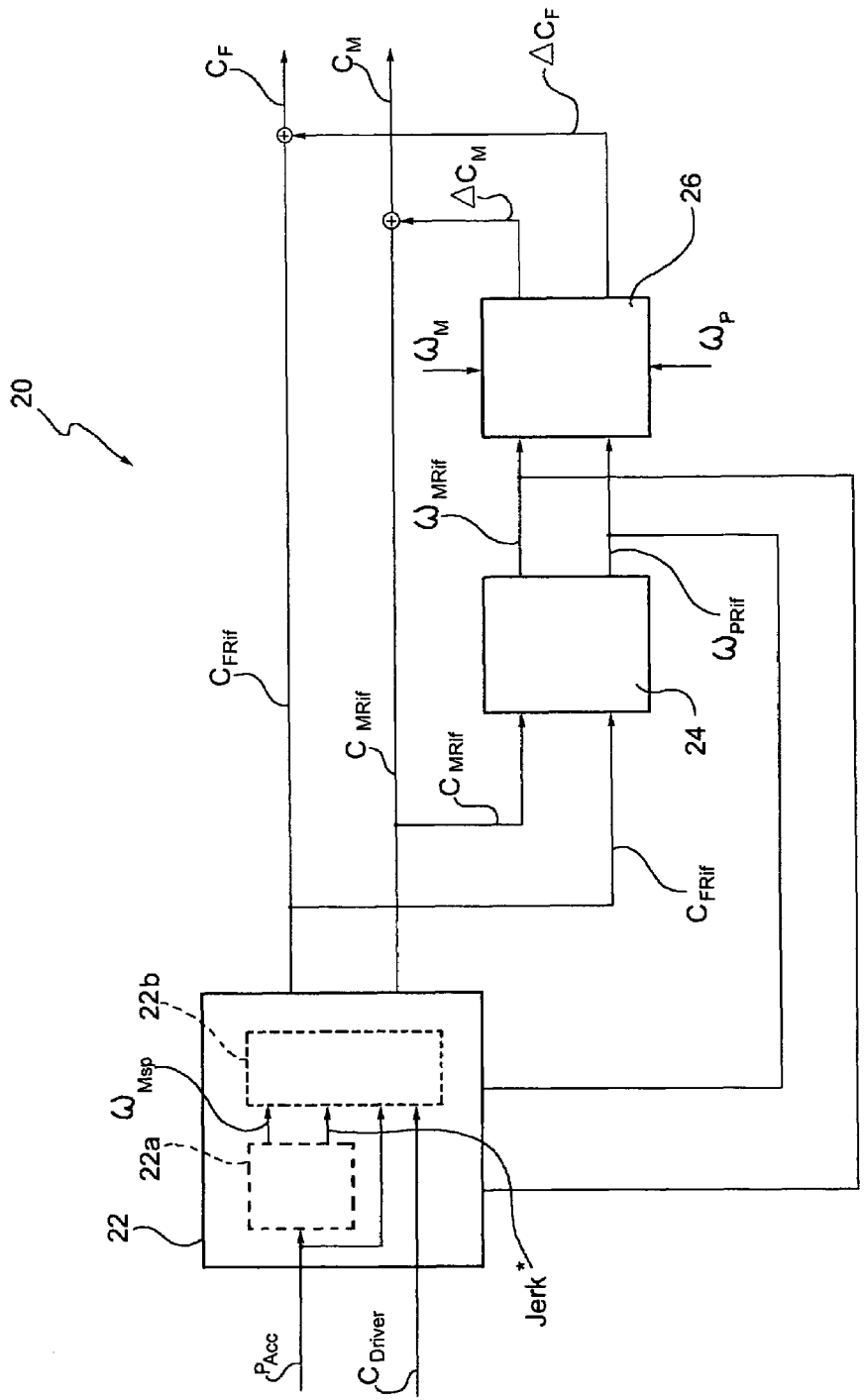
FIG. 2 is a block diagram of the system for controlling the servo-controlled gearbox proposed by the invention.

FIG. 2 shows in detail the logical diagram of a control system for the servo-controlled gearbox G, indicated as a whole by 20, the system being implemented preferably in the gearbox control unit $ECU_G$, but being distributed between the separate units $ECU_E$ and $ECU_G$ if required.

The system 20 comprises a torque reference generator module 22 arranged for calculating the variation in time of a reference torque $C_{MRif}$ requested from the thermal engine and of a reference torque $C_{FRif}$ transmittable by the friction clutch, on the basis of a command imparted by the driver by the operation of the accelerator pedal $P_{ACC}$. The command may be, say, a command to accelerate from a standing start, or a command to change gear.

The curve of $C_{MRif}$ and $C_{FRif}$ against time is calculated on the basis of a reference model as a function of intermediate parameters such as the variation in longitudinal acceleration of the vehicle (jerk), the torque requested by the driver $C_{Driver}$ and the angular velocity of the driveshaft (engine revolutions) $\omega_{Msp}$ in the manoeuvre requested by the driver, derived from the information about the position of the accelerator pedal.

The signals indicating both the position of the accelerator pedal and the torque requested by the driver $C_{Driver}$ are communicated to the gearbox control unit $ECU_G$ by the engine control unit $ECU_E$ via the transmission line BUS of the CAN network.

The signal indicating the requested torque $C_{Driver}$ is calculated in the engine control unit $ECU_E$, by means of a reference model stored in the associated memory $M_E$, while the signals indicating the jerk and the engine revolutions requested in the manoeuvre are calculated in the gearbox control unit $ECU_G$, by means of reference models stored in the associated memory $M_G$.

The torque reference generator module sends from its output a pair of reference torque request signals or data, indicating the reference torque $C_{MRif}$ requested from the thermal engine and the transmittable torque $C_{FRif}$ transmittable by the friction clutch.

These signals are supplied to the input of an engine speed estimator module 24, adapted to calculate the reference angular velocities of the driveshaft and of the primary gear shaft, indicated below by $\omega_{MRif}$ and $\omega_{PRif}$ respectively, on the basis of the information on the temporal variation of the torques $C_{MRif}$ and $C_{FRif}$, according to a simplified transmission model which is mentioned briefly below.

The signals $\omega_{MRif}$ and $\omega_{PRif}$ are then supplied by feedback to the generator module 22 and to the input of a controller module 26 adapted to calculate the error between the reference angular velocities calculated by the estimator module 24 and the actual angular velocities measured by sensors installed on board the vehicle and acquired at the engine control unit and the gearbox control unit.

More specifically, the signal indicating the actual angular velocity of the driveshaft $\omega_M$ is acquired at the input of the engine control unit $ECU_E$ by means of the sensor indicated as $SENS_E$ in FIG. 1, and communicated to the gearbox control unit $ECU_G$ via the line BUS, while the signal indicating the actual angular velocity of the primary gear shaft $\omega_P$ is acquired directly by the unit $ECU_G$ by means of the sensor indicated by $SENS_G$ in FIG. 1.

The estimator module 24 and the controller module 26, in series, form a closed loop compensator.

On the basis of the comparison between the reference angular velocities and the actual velocities, the controller module 26 determines corrective torque contributions $\Delta C_M$ and $\Delta C_F$ and sends corresponding signals or data which are added to the open-loop reference torque request signals or data $C_{FRif}$ and $C_{MRif}$ originated by the module 22 in order to generate corresponding torque request signals $C_M$ and $C_F$.

The signals $C_M$ and $C_F$ are supplied through the engine and gearbox control units to the actuators $ACT_E$ and $ACT_G$, which are, respectively, the engine control actuator and the friction clutch operation actuator. More specifically, the signal $C_M$ is supplied by the gearbox control unit $ECU_G$ to the engine control unit $ECU_E$ via the line BUS, while the signal $C_F$ is used by the gearbox control unit $ECU_G$ for controlling the actuator $ACT_G$ which operates the friction clutch.

Figure 3:
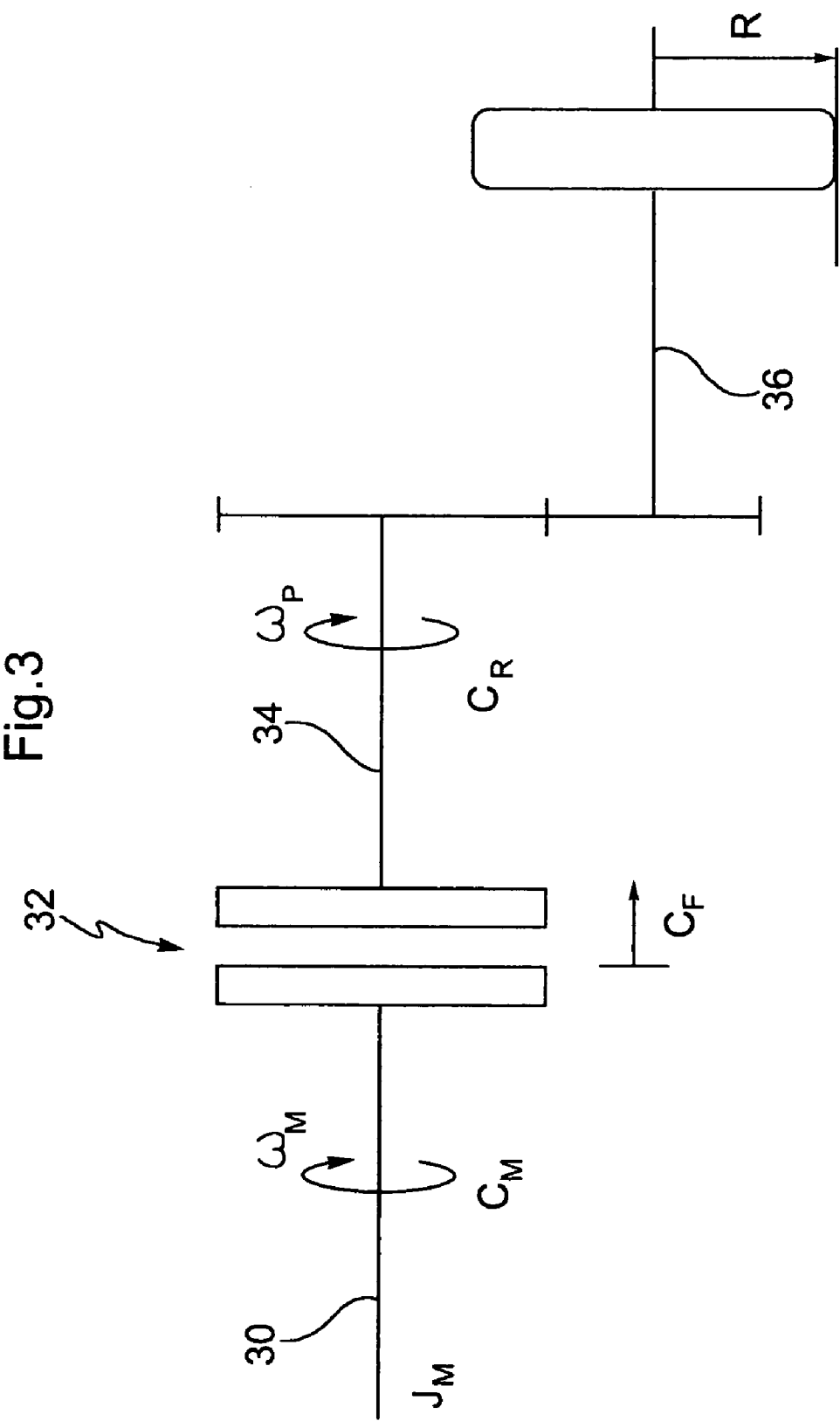
FIG. 3 is a simplified model of the motion transmission used by the control system of FIG. 2, and FIGS. 4a and 4b show respective pairs of time diagrams which illustrate the variation of the variables controlled by the system.

For the calculation of the reference torques and angular velocities and for the closed loop compensation, use is made of a linear model of the transmission in which the thermal engine and the gearbox clutch are considered to be torque actuators, and no allowance is made for resilient elements (such as flexible couplings) and frictional phenomena between the mechanical members. The model and the corresponding variables and parameters are represented in FIG. 3.

The driveshaft is indicated by 30 and an overall moment of inertia of the engine $J_M$ relates to it. $\omega_M$ and $C_M$ indicate, respectively, the angular velocity of the driveshaft and the net engine torque on the shaft.

Numeral 32 indicates the coupling clutch between the driveshaft 30 and the gearbox, the latter comprising a primary input shaft 34 and a secondary shaft 36 coupled to the differential and, by means of the latter, to the driving wheels.

$C_F$ indicates the torque transmitted by the clutch, which can be modulated as a function of the degree of engagement and sliding of the clutch. $\omega_P$ indicates the angular velocity of the primary shaft. This shaft, together with the secondary shaft and the devices located downstream of the gears, presents a total resistant torque $C_R$ to the clutch.

The system represented by the model of FIG. 3 is described by the following equations.

In the engaged clutch condition:

$$C_M(t) - C_R(t) = (J_M + J_P) \cdot \frac{d\omega_M}{dt} \quad (1)$$

In the disengaged clutch condition, with modulation:

$$C_M(t) - C_F(t) = J_M \cdot \frac{d\omega_M}{dt} \quad (2)$$

on the engine side, and $$C_F(t) - C_R(t) = J_P \cdot \frac{d\omega_P}{dt} \quad (3)$$

on the gearbox side, where $J_P$ indicates the total moment of inertia found on the primary shaft, which depends on the moment of inertia of the driven disc of the clutch JDC, on the moment of inertia of the primary shaft of the gearbox $J_{PS}$, and on the total moment of inertia of the vehicle, found at the output of the differential $J_V$ using a constant of proportionality as a function of the selected transmission ratio τ, according to the equation $$J_P = J_{DC} + J_{PS} + \frac{J_V}{\tau^2} \quad (4)$$

The total moment of inertia of the vehicle found at the output of the differential can be calculated according to the equation $$J_V = M \cdot R^2 + 4 \cdot J_W \quad (5)$$

or in other words as a function of the moment of inertia of the wheels $J_W$ and of the mass of the vehicle M and the rolling radius of the wheels R.

The longitudinal acceleration of the vehicle is related to the acceleration of the primary gear shaft by the relation $$a_x = \frac{d\omega_w}{dt} \cdot R = \frac{d\omega_P}{dt} \cdot \frac{R}{\tau} \quad (6)$$

The variation of the rotation speed of the primary gear shaft depends on the torque transmitted by the clutch according to equation (3) of the transmission model; in other words, $$\frac{d\omega_P}{dt} = \frac{C_F(t) - C_R(t)}{J_P} \quad (7)$$

The acceleration of the vehicle may therefore be expressed as a function of the torque transmitted by the clutch and of the total resistant torque:

$$a_x = \frac{d\omega_P}{dt} \cdot \frac{R}{\tau} = \frac{C_F(t) - C_R(t)}{J_P} \cdot \frac{R}{\tau} \quad (9)$$

In response to a command to couple the driveshaft of the vehicle's propulsion system to the gearbox, for example when changing gear or driving away or when a vehicle is set in motion by an electric machine of the starter-alternator type, the engine/gearbox system changes its mode of operation from operating with the clutch partially disengaged, where it is controlled by equation (3), to operating with the clutch engaged, where it is controlled by equation (1).

At the instant the clutch engages, the inertia applied to the engine changes virtually instantaneously, causing a discontinuity in the acceleration of the vehicle in systems of the prior art. This variation of inertia is compensated for by the model according to the invention.

Figure 4A:
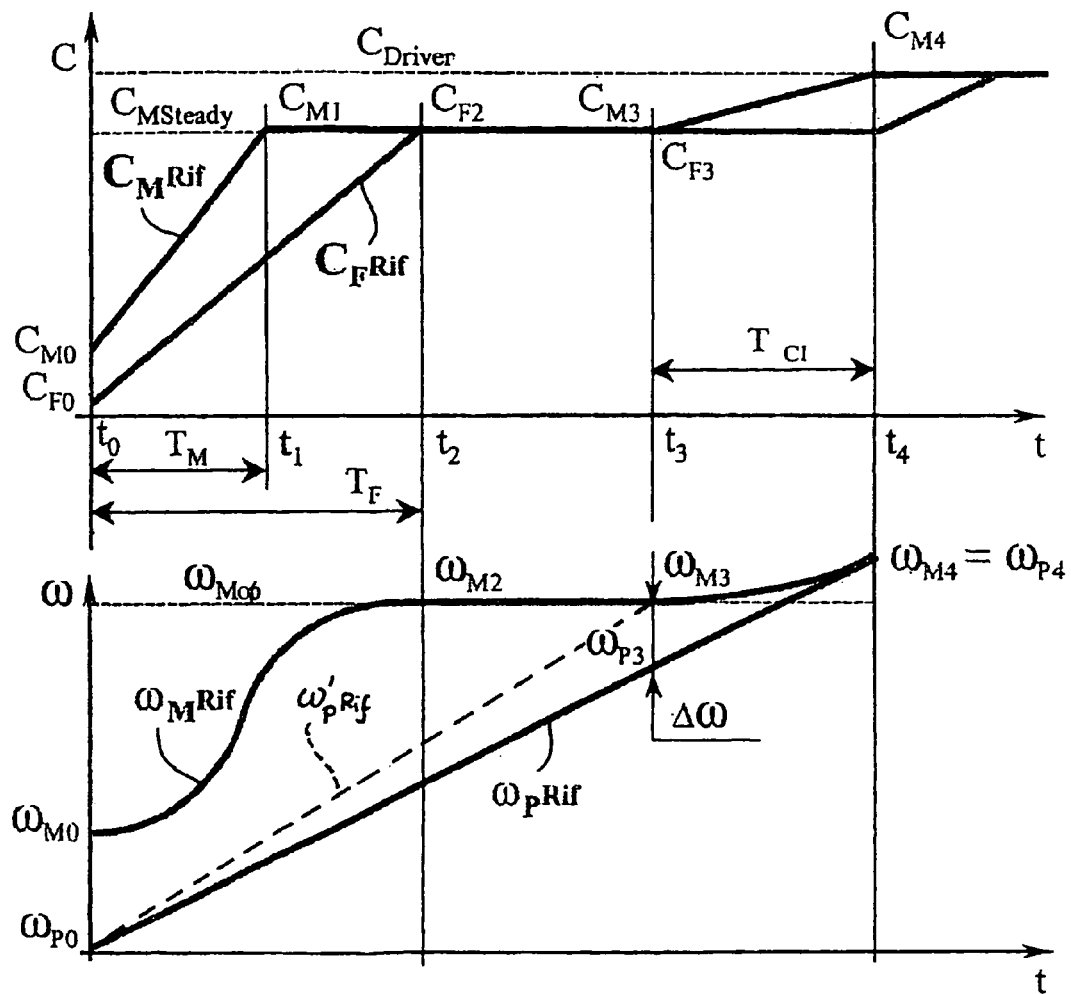
Figure 4B:
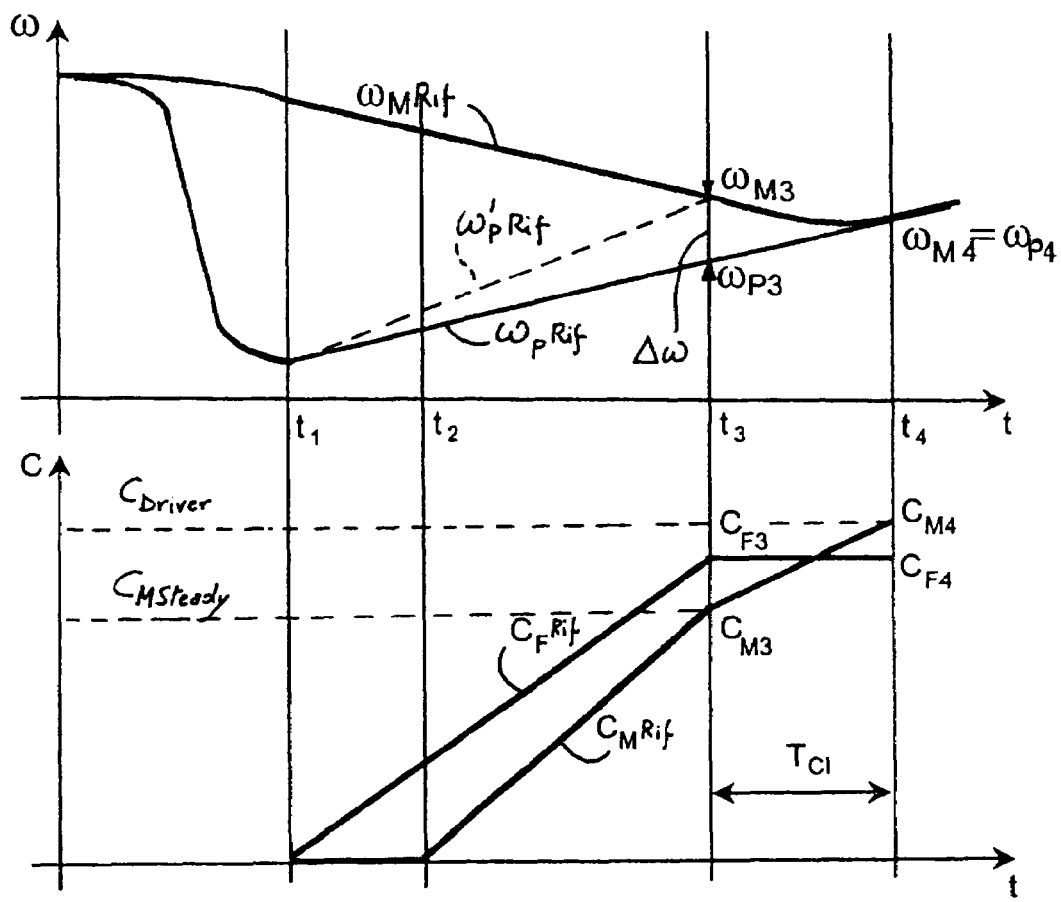

With reference to FIGS. 4a and 4b, these show time diagrams which illustrate the curve of the variables (torques and angular velocities) controlled by the system first in an embodiment for controlling a driving-away manoeuvre and then for a gear-changing manoeuvre, when a method is applied for compensating for the variation of inertia.

It is assumed that the angular velocities of the driveshaft and of the primary shaft of the gearbox are synchronized at the instant $t_3$ (hypothetical curve of the reference angular velocity of the primary shaft $\omega'_{PRif}$ shown in broken lines). If the values of the engine and clutch torques are known prior to the instant $t_3$, the rotation speeds of the driveshaft and the primary gear shaft can be synchronized according to the relation $$\omega_P(t_3) = \omega_M(t_3) \quad (10)$$

The variation of inertia as seen from the engine generates a variation of acceleration which can be calculated considering the acceleration at the instant $t_3$ which precedes the synchronization and at the following instant $t_{3+}$.

At the instant $t=t_{3-}$, the clutch is disengaged, and therefore relation (3) is still true; from this we can find the acceleration according to relation (9):

$$a_x(t_{3-}) = \frac{d\omega_P}{dt} \cdot \frac{R}{\tau}\bigg|_{t_{3-}} = \frac{C_F(t_{3-}) - C_R(t_{3-})}{J_P} \cdot \frac{R}{\tau} \quad (11)$$

At the instant $t=t_{3+}$, the clutch is engaged, and therefore relation (1) is true and consequently the acceleration is as follows:

$$a_x(t_{3+}) = \frac{d\omega_M}{dt} \cdot \frac{R}{\tau}\bigg|_{t_{3+}} = \frac{C_M(t_{3+}) - C_R(t_{3-})}{J_M + J_P} \cdot \frac{R}{\tau} \quad (12)$$

The variation of acceleration between the instant $t_3$ and the instant $t_{3+}$ can therefore be calculated as $$\Delta a_x = a_x(t_{3+}) - a_x(t_{3-}) \quad (13)$$

and given that $$\begin{cases} C_M(t_{3-}) = C_M(t_{3+}) = C_{M3} \\ C_F(t_{3-}) = C_F(t_{3+}) = C_{F3} \\ C_R(t) = C_R = c \end{cases} \quad (14)$$

we find that $$\Delta a_x = \left[\frac{C_{M3} - C_R}{J_M + J_P} - \frac{C_{F3} - C_R}{J_P}\right] \cdot \frac{R}{\tau} \quad (15)$$

$$\Delta a_x = \left[\frac{C_{M3}}{J_M + J_P} - \frac{C_{F3}}{J_P} + C_R \cdot \left(\frac{1}{J_P} - \frac{1}{J_M + J_P}\right)\right] \cdot \frac{R}{\tau} \quad (16)$$

Since $C_{M3} = C_{F3}$ at the instant of synchronization, and assuming for simplicity that the resistant torque is zero ($C_R = 0$), a negative variation of acceleration would be found:

$$\Delta a_x = \left[\frac{1}{J_M + J_P} - \frac{1}{J_P}\right] \cdot \frac{R}{\tau} \cdot C_{M3} \quad (17)$$

$$\Delta a_x = -\frac{J_M}{J_M + J_P} \frac{R}{J_P} \frac{R}{\tau} C_{M3} \quad (18)$$

In order to enable the control system to compensate for the equivalent variation of inertia and the correlated discontinuities in the acceleration of the vehicle due to the engagement of the friction clutch, the reference torques as shown in the graph of FIGS. 4a and 4b are considered, and both the synchronization between the angular velocities of the driveshaft and of the primary gear shaft and the cancellation of the derivative difference between $\omega_M$ e $\omega_P$, i.e. the equality between the angular accelerations are imposed at the instant $t_4$.

In mathematical terms, the aforesaid condition is expressed by the following equation:

$$\left.\frac{d\omega_M}{dt}\right|_{t4} = \left.\frac{d\omega_P}{dt}\right|_{t4} \qquad (19)$$

According to equations (1) and (3), reproduced here for ease of reference, $$\begin{cases} C_M(t) - C_R(t) = (J_M + J_P) \cdot \frac{d\omega_M}{dt} \\ C_F(t) - C_R = J_P \cdot \frac{d\omega_P}{dt} \end{cases} \qquad (20)$$

and with the introduction of the condition (19), we obtain:

$$\begin{cases} \frac{C_M(t_4) - C_R(t_4)}{J_M + J_P} = \left.\frac{d\omega_M}{dt}\right|_{t4} \\ \frac{C_F(t_4) - C_R(t_4)}{J_P} = \left.\frac{d\omega_P}{dt}\right|_{t4} \end{cases} \qquad (21)$$

Assuming that the resistant torque is constant (the hypothesis that $C_R(t)=C_{RO}$), then, given constant clutch torque (i.e. with a zero derivative) as represented in the related graphs in FIGS. 4a and 4b, the following conditions are obtained:

$$\begin{cases} C_M(t_4) = C_{M4} \\ C_F(t_3) = C_F(t_4) = C_{F3} = C_{F4} \\ C_R(t) = C_{RO} \end{cases} \qquad (22)$$

By introducing the relation (19) and substituting the conditions (22) in the relation (21), we find the constraint which provides a zero variation of acceleration:

$$\frac{C_{M4} - C_{RO}}{J_M + J_P} = \frac{C_{F3} - C_{RO}}{J_P} \qquad (23)$$

or alternatively $$C_{F3} = \frac{J_M \cdot C_{RO} + J_P \cdot C_{M4}}{J_P + J_M} \qquad (24)$$

By contrast with the assumptions made in relation (10), it is therefore advantageous to specify the synchronization of the angular velocities of the driveshaft and of the primary gear shaft at the instant $t_4$, i.e.:

$$\omega_P(t_4) = \omega_M(t_4) \qquad (25)$$

To check that the synchronization condition has been attained at the instant $t_4$, equations (2) and (3) are integrated between the instants $t_3$ and $t_4$:

$$\begin{cases} \int_{t_3}^{t_4} \frac{d\omega_M}{dt} \cdot J_M \cdot dt = \int_{t_3}^{t_4} (C_M(t) - C_F(t)) \cdot dt \\ \int_{t_3}^{t_4} \frac{d\omega_P}{dt} \cdot J_P \cdot dt = \int_{t_3}^{t_4} (C_F(t) - C_R) \cdot dt \end{cases} \qquad (26)$$

Resolving the integral and assuming, as in conditions (22), that $C_{F3}=C_{F4}$, we obtain $$\begin{cases} (\omega_{M4} - \omega_{M3}) \cdot J_M = \frac{C_{M4} + C_{M3}}{2} \cdot T_{CI} - C_{F3} \cdot T_{CI} \\ (\omega_{P4} - \omega_{P3}) \cdot J_P = C_{F3} \cdot T_{CI} - C_{RO} \cdot T_{CI} \end{cases} \qquad (27)$$

and by imposing the synchronization defined by relation (25) we obtain:

$$\omega_{M3} - \omega_{P3} = C_{F3} \cdot \left(\frac{1}{J_M} + \frac{1}{J_P}\right) \cdot T_{CI} - \frac{C_{M4} + C_{M3}}{J_M} \cdot \frac{T_{CI}}{2} - \frac{C_{RO}}{J_P} \cdot T_{CI} \qquad (28)$$

By imposing the constraint of zero variation of the acceleration (relation (23) and specifying that $\omega_{M3}-\omega_{P3}=\Delta\omega$, we obtain:

$$\Delta\omega = \frac{C_{M4} - C_{M3}}{2 \cdot J_M} \cdot T_{CI} \qquad (29)$$

Given the constraint at the instant $t_3$ $$C_{M3} = C_{F3} \qquad (30)$$

and the constraint of zero variation of acceleration specified by relation (23), relation (29) can be written as:

$$\Delta\omega = \frac{C_{M4} - \frac{J_M \cdot C_{RO} + J_P \cdot C_{M4}}{J_P + J_M}}{2 \cdot J_M} \cdot T_{CI} \qquad (31)$$

and therefore $$\Delta\omega = \frac{C_{M4} - C_{RO}}{2 \cdot (J_M + J_P)} \cdot T_{CI} \qquad (32)$$

The time $T_{CI}$ required for synchronization with inertia compensation from a predetermined value of $\Delta\omega$ can therefore be calculated:

$$T_{CI} = \frac{2 \cdot (J_M + J_P) \cdot \Delta\omega}{C_{M4} - C_{RO})} \qquad (33)$$

If we take the constraint (30) to be not $C_{M3}=C_{F3}$, but a looser constraint, specifically:

$$C_{M3} \leq C_{F3} \qquad (34)$$

from relation (28), by imposing the constraint of zero variation of the acceleration (relation (23), taking $\omega_{M3}-\omega_{P3}=\Delta\omega$ and imposing synchronization of the angular velocities of the driveshaft and primary gear shaft at instant $t_4$, expressed in relation (25), we obtain:

$$T_{CI} = \frac{2 \cdot J_M \cdot J_P \cdot \Delta\omega}{2 \cdot J_M \cdot (C_{F3} - C_{R0}) + J_P \cdot (2 \cdot C_{F3} - C_{M3} - C_{M4})} \quad (35)$$

Substituting condition (24) gives:

$$T_{CI} = \frac{2 \cdot J_M \cdot J_P \cdot \Delta\omega}{2 \cdot (J_M \cdot C_{R0} + J_P \cdot C_{M4}) - J_P \cdot (C_{M3} + C_{M4}) - 2 \cdot J_M \cdot C_{R0}} \quad (36)$$

which finally gives:

$$T_{CI} = \frac{2 \cdot J_M \cdot \Delta\omega}{(C_{M4} - C_{M3})} \quad (37)$$

corresponding to relation (33) in the particular case in which $C_{M3}=C_{F4}$.

The model therefore requires that, in order to obtain inertia compensation, the engine should be operated at the instant $t_3$ with a constant torque derivative $dC_{MCI}$ for a period equal to the inertia compensation time $T_{CI}$.

Given that $$\frac{dC_M(t)}{dt} = \frac{C_M(t_4) - C_M(t_3)}{T_{CI}} = \frac{C_{M4} - C_{M3}}{T_{CI}} = dC_{MCI} \quad (38)$$

and substituting the value of $T_{CI}$ calculated in (33) or (37), we obtain:

$$dC_{MCI} = \frac{C_{M4} - C_{M3}}{2 \cdot (J_M + J_P) \cdot \Delta\omega} \cdot (C_{M4} - C_{R0}) \quad (39)$$

or $$dC_{MCI} = \frac{(C_{M4} - C_{M3})^2}{2 \cdot J_M \cdot \Delta\omega} \quad (40)$$

Condition (34) from which relations (37) and (40) are derived is typical of an upward gear-changing manoeuvre, when the start of the phase of recovery of the variation of inertia is identified by instant t3 at which $\Delta\omega=\omega_{M3}-\omega_{P3}$ reaches a predetermined value.

The operation of the control system 20 is described below on the basis of the model described above; with reference to the diagram of FIG. 2 and to the diagrams of FIGS. 4a and 4b.

The system 20 acquires signals indicating the driving-away or gear-change command imparted by the driver, and in particular acquires, from the actuation of the accelerator pedal, a first signal indicating the reference value, jerk*, of the derivative of the longitudinal acceleration (the so-called jerk)

$$\text{jerk*}=f_{jerk}(Pacc) \quad (41)$$

a second signal indicating the angular velocity of the driveshaft (number of revolutions of the engine) $\omega_{Mop}$ $$\omega_{Mop}=f_{\omega Mop}(Pacc)+\omega_{Mop\,min} \quad (42)$$

and a third signal indicating the value of the requested torque $C_{Driver}$ $$C_{Drive}=f_{cdriver}(Pacc) \quad (43)$$

The requested torque $C_{Driver}$ is determined by comparison with predetermined relation maps stored in the memory device $M_E$ by the engine control unit $ECU_E$.

The parameters jerk* and $\omega_{Mop}$ can also be determined in the engine control unit $ECU_E$, on the basis of relation models stored in the memory $M_E$, or, in the currently preferred embodiment, can be determined directly in the gearbox control unit $ECU_G$ by a sub-module 22a connected upstream of a calculation sub-module 22b on the basis of predetermined relation models mapped in the memory $M_G$.

With reference to FIGS. 4a and 4b, the value of the steady torque requested by the driver, $C_{Driver}$, is interpreted as the reference steady torque for the engine and the clutch at the end of the driving-away or gear-changing manoeuvre. In order to apply the temporal variation model shown in the figure to the control of the inertia variation compensation, the control system specifies an intermediate steady torque for the engine and for the clutch, defined as follows:

$$C_{MSteady}=K_{MSteady} \cdot C_{Driver} \quad (44)$$

in which $$K_{MSteady} = \frac{J_P}{J_M + J_P} \quad (45)$$

according to relation (23) above.

By means of the module 22, the system determines the signal indicating the temporal variation of the reference torque $C_{FRif}$ transmittable by the clutch, and a signal indicating the variation in time of the requested engine torque $C_{MRif}$ as a function of the clutch torque and of the signal indicating the angular velocity of the driveshaft. The derivative of the engine torque is always greater than the derivative of the clutch torque, and of course limited to the maximum value that can be handled by the engine.

FIG. 4a shows the diagrams of the variation of the reference torque $C_{MRif}$ requested from the thermal engine and that of the reference torque $C_{FRif}$ transmittable by the friction clutch; and also the angular velocity of the driveshaft and that of the primary gear shaft $\omega_{MRif}$ and $\omega_{PRif}$ in an embodiment for controlling a driving-away manoeuvre.

The signal $C_{FRif}$ indicating the reference torque requested from the friction clutch has a linear temporal variation in the form of a ramp in a first and second stage of the driving-away manoeuvre (for $t_0<t<t_2$), the gradient of which is proportional to the value of the data element indicating the variation of the longitudinal acceleration, and is then kept constant (for $t_2<t<t_4$).

The signal $C_{MRif}$ indicating the reference torque requested from the driveshaft has a linear temporal variation in the form of a ramp in a first stage of the driving-away manoeuvre ($t_0<t<t_1$), the gradient of which is a function of the angular velocity of the driveshaft requested on driving away ($\omega_{Mop}$) and of the gradient of the temporal variation ramp of the signal indicating the reference torque ($C_{FRif}$) requested from the friction clutch, is then kept constant in an intermediate phase ($t_1<t<t_3$), and has a linear temporal variation in the form of a ramp in a terminal phase, that is in the interval $T_{CI}$ ($t_3<t<t_4$) of compensation for the inertia, beginning at the instant at which the difference between the angular velocities ($\omega_{MRif}$, $\omega_{PRif}$) of the driveshaft and of the primary gear shaft calculated by the estimator module is less than a predetermined threshold value.

In mathematical notation this can be expressed as:

$C_{MRif}(t)=C_{M0}+dC_M \cdot t$ for $t_0 \leq t \leq t_1$ $C_{MRif}(t)=C_{Msteady}$ for $t_1<t \leq t_3$ $C_{MRif}(t)=C_{Msteady}+dC_{MCI} \cdot t$ for $t_3<t \leq t_4$ (46)

and $C_{FRif}(t)=C_{F0}+dC_F \cdot t$ for $t_0 \leq t \leq t_2$ $C_{FRif}(t)=C_{Msteady}$ for $t_2<t \leq t_4$ (47)

where $dC_M$ and $dC_F$ are calculated as a function of the constant reference jerk and of the value of the angular velocity of the driveshaft which it is wished to achieve.

FIG. 4b shows the diagrams of the variation of the reference torque $C_{MRif}$ requested from the thermal engine and of the reference torque $C_{FRif}$ transmittable by the friction clutch, in addition to the angular velocities of the driveshaft and of the primary gear shaft $\omega_{MRif}$ and $\omega_{PRif}$ in an embodiment for controlling an upward gear-changing manoeuvre, with positive torque requested.

In this case the constraint (30) is taken to be not $C_{M3}=C_{F3}$, but rather the looser constraint (34), namely $C_{M3} \leq C_{F3}$, while the torque value $C_{M4}$ is set as a function of the position of the accelerator pedal.

The signal $C_{FRif}$ indicating the reference torque requested from the friction clutch has a linear temporal variation in the form of a slope in a first and second stage of the driving-away manoeuvre (for $t_1<t<t_3$), the gradient of which is proportional to the value of the data element indicating the variation of the longitudinal acceleration (jerk) and is then kept constant (for $t_3<t<t_4$).

The signal $C_{MRif}$ indicating the reference torque requested from the driveshaft has the zero value in a first stage of the manoeuvre ($t_1<t<t_2$), and a linear temporal variation in the form of a ramp in a second stage of the manoeuvre ($t_2<t<t_3$), the gradient of which is a function of the requested driveshaft angular velocity ($\omega_{Mop}$) and of the gradient of the ramp of the temporal variation of the signal indicating the reference torque ($C_{FRif}$) requested from the friction clutch and has a linear temporal variation in the form of a ramp with a different gradient in a terminal phase, that is in the interval $T_{CI}$ ($t_3<t<t_4$) of compensation for the inertia.

In mathematical notation this can be expressed as:

$C_{MRif}(t)=0$ for $t_1<t \leq t_2$ $C_{MRif}(t)=dC_M \cdot t$ for $t_2 \leq t \leq t_3$ $C_{MRif}(t)=C_{Msteady}+dC_{MCI} \cdot t$ for $t_3<t \leq t_4$ (48)

and $C_{FRif}(t)=dC_F \cdot t$ for $t_1 \leq t \leq t_3$ $C_{FRif}(t)=C_{F3}$ for $t_3<t \leq t_4$ (49)

where $dC_M$ and $dC_F$ are calculated as a function of the constant reference jerk and of the value of the angular velocity of the driveshaft which it is wished to achieve.

In both embodiments, in the temporal variation of the engine and clutch torques, the condition in which the difference between $\omega_M$ and $\omega_P$ is less than the predetermined threshold $\Delta\omega_{CI}$ is reached at the instant $t_3$.

The compensation for the inertia is therefore controlled by varying the engine torque, the variation in time of which is calculated, either:

$$dC_{MCI} = \frac{C_{Driver} - C_{MSteady}}{2 \cdot (J_M + J_P) \cdot \Delta\omega_{CI}} \cdot C_{Driver} \quad (50)$$

or $$dC_{MCI} = \frac{(C_{Driver} - C_{MSteady})^2}{2 \cdot J_M \cdot \Delta\omega_{CI}} \quad (51)$$

according to relation (39) or relation (40) of the model described, to synchronize the angular velocity of the driveshaft $\omega_M$ with the angular velocity $\omega_P$ of the primary gear shaft $\omega_P$, the temporal variation of which is unmodified.

The estimator module 24 of the control system therefore assumes two different operating conditions, namely a first operating condition with the clutch disengaged in modulation and a second operating condition with the clutch engaged, in other words with the angular velocities of driveshaft and of the primary gear shaft synchronized.

In the first operating condition, it determines the signals $$\omega_{MRif} = \int \frac{C_{MRif}(t) - C_{FRif}(t)}{J_M} dt \quad (52)$$

and $$\omega_{PRif} = \int \frac{C_{FRif}(t)}{J_P} dt \quad (53)$$

In the second operating condition, it determines the signals $$\omega_{MRif} = \int \frac{C_{MRif}(t)}{J_M + J_P} dt \quad (54)$$

and $$\omega_{PRif} = \omega_{MRif} = \int \frac{C_{MRif}(t)}{J_M + J_P} dt \quad (55)$$

Relations (52)-(55) are applicable both to the driving-away manoeuvre and to upward gear changing manoeuvre.

The calculated signals $\omega_{MRif}$ and $\omega_{PRif}$ are then supplied by feedback to the generator module 22 to permit the recognition of the condition of synchronization between $\omega_{MRif}$ and $\omega_{PRif}$ which identifies the change from the operating condition with modulation of the clutch to the engaged clutch condition.

The signals $C_{MRif}$ and $C_{FRif}$ are corrected in real time, by summing the respective corrective contributions $\Delta C_M$ and $\Delta C_F$ calculated by the controller module 26, by comparison with the actual angular velocities of the driveshaft and of the primary gear shaft measured by the on-board sensors.

Clearly, provided that the principle of the invention is retained, the forms of application and the details of construction can be varied widely from what has been described and illustrated purely by way of example and without restrictive intent, without departure from the scope of protection of the present invention as defined by the attached claims.

What is claimed is:

1. System for controlling the coupling between a driveshaft of a propulsion system of a motor vehicle and a primary input shaft of a gearbox through a servo-assisted friction clutch, comprising electronic processing means adapted to receive at their inputs signals or data indicating a command imparted by the driver of the motor vehicle by the operation of the accelerator pedal, and arranged for generating command signals or data designed to control torque actuator devices of the propulsion system and of the friction clutch on the basis of a mathematical reference model, wherein the processing means are arranged for generating, on the basis of the signals or data indicating the command imparted by the driver by the operation of the accelerator pedal and of the reference model, in a driving-away or gear-changing manoeuvre, reference torque request signals or data indicating the reference torque requested from the driveshaft and the reference torque requested from the friction clutch, the said request signals or data varying in time in such a way as to cause synchronization between the angular velocities of the driveshaft and of the primary gear shaft to be reached at the same moment as the difference between the angular accelerations of the said shafts becomes zero.

2. Control system according to claim 1, wherein the processing means include:

a reference torque generator module arranged for generating, on the basis of the signals or data indicating the command imparted by the driver by the operation of the accelerator pedal and of the reference model, reference torque request signals or data indicating the reference torque requested from the driveshaft and the reference torque requested from the friction clutch;

an estimator module, arranged for calculating, on the basis of the reference torque request signals or data and on the basis of the reference model, signals or data indicating the angular velocities of the driveshaft and of the primary gear shaft; and a controller module, arranged for calculating, on the basis of the signals or data indicating the angular velocities of the driveshaft and of the primary gear shaft calculated by the estimator module, and on the basis of detected signals or data indicating the actual angular velocities of the driveshaft and of the primary gear shaft, corrective contributions to the said reference torque request signals or data, whereby the said torque request signals or data as modified by the corresponding corrective contributions, form the command signals or data for the torque actuator devices.

3. System according to claim 1, wherein the signal indicating the reference torque requested from the driveshaft has a linear temporal variation in the form of a ramp from the instant at which the difference between the angular velocities of the driveshaft and of the primary gear shaft is less than a predetermined threshold value.

4. System according to claim 1, in which the said signals or data indicating the command imparted by the driver by the operation of the accelerator pedal include a signal or datum indicating the position of the accelerator pedal.

5. System according to claim 4, in which the said signals or data indicating the command imparted by the driver by the operation of the accelerator pedal include a signal or datum indicating the requested variation of longitudinal acceleration of the vehicle, determined as a function of the signal or datum indicating the position of the accelerator pedal on the basis of a predetermined relation model.

6. System according to claim 4, in which the said signals or data indicating the command imparted by the driver by the operation of the accelerator pedal include a signal or datum indicating the requested torque, determined as a function of the signal or datum indicating the position of the accelerator pedal on the basis of a predetermined relation model.

7. System according to claim 6, in which the said signals or data indicating the command imparted by the driver by the operation of the accelerator pedal include a signal or datum indicating the angular velocity of the driveshaft requested, determined as a function of the signal or datum indicating the position of the accelerator pedal on the basis of a predetermined relation model.

8. System according to any one of the preceding claims, in which the said processing means comprise separate control units for the engine and for the gearbox, connected to a common transmission line, and adapted to be interfaced with corresponding torque actuators of the propulsion system and of the friction clutch, the engine control unit controlling the torque actuator devices of the propulsion system as a function of the torque request signal generated by the gearbox control unit.

9. System according to any one of claims 1 to 7, in which the said processing means comprise a single integrated electronic control unit adapted to be interfaced with torque actuator devices of the propulsion system and of the friction clutch.

10. Method for controlling the coupling between a driveshaft of a propulsion system of a motor vehicle and a primary input shaft of a gearbox through a servo-assisted friction clutch, comprising the following operations:

acquisition of signals or data indicating a command imparted by the driver of the motor vehicle by the operation of the accelerator pedal; and generation of command signals or data intended to control torque actuator devices of the propulsion system and of the friction clutch on the basis of a mathematical reference model, generation, on the basis of the signals or data indicating the command imparted by the driver by the operation of the accelerator pedal and of the mathematical reference model, in a driving-away or gear-changing manoeuvre, of reference torque request signals or data indicating the reference torque requested from the driveshaft and the reference torque requested from the friction clutch, the said request signals or data varying in time in such a way as to cause synchronization between the angular velocities of the driveshaft and of the primary gear shaft to be reached at the same moment as the difference between the angular accelerations of the said shafts becomes zero.

11. Method according to claim 10, comprising the following operations:

estimating, on the basis of the reference torque request signals or data and on the basis of the reference model, signals or data indicating the angular velocities of the driveshaft and of the primary gear shaft; and determining, on the basis of the signals or data indicating the estimated angular velocities of the driveshaft and of the primary gear shaft, and on the basis of detected signals or data indicating the actual angular velocities of the driveshaft and of the primary gear shaft, corrective contributions to the said reference torque request signals or data, the said torque request signals or data, as modified by the corresponding corrective contributions, forming command signals or data intended for the control of torque actuator devices of the propulsion system and of the friction clutch.

12. Method according to claim 10, wherein the signal indicating the reference torque requested from the driveshaft has a linear temporal variation in the form of a ramp beginning at the instant at which the difference between the angular velocities of the driveshaft and of the primary gear shaft is less than a predetermined threshold value.

13. Method according to claim 10, comprising the detection of a signal or datum indicating the position of the accelerator pedal following the command imparted by the driver by the operation of the accelerator pedal.

14. Method according to claim 13, comprising the determination of a signal or datum indicating the variation of longitudinal acceleration of the vehicle requested by means of the command imparted by the driver, as a function of the signal or datum indicating the position of the accelerator pedal, on the basis of a predetermined relation model.

15. Method according to claim 14, comprising the determination of a signal or datum indicating the torque requested by means of the command imparted by the driver, as a function of the signal or datum indicating the position of the accelerator pedal, on the basis of a predetermined relation model.

16. Method according to claim 15, comprising the determination of a signal or datum indicating the angular velocity of the driveshaft torque requested, as a function of the signal or datum indicating the position of the accelerator pedal, on the basis of a predetermined relation model.

* * * * *